United States Patent
Han et al.

(10) Patent No.: US 8,947,765 B2
(45) Date of Patent: Feb. 3, 2015

(54) LIGHT-EMITTING APPARATUS CAPABLE OF ADJUSTING A COLOR OF A PROJECTED LIGHT THEREOF

(71) Applicant: Samsung Electronics Co., Ltd., Suwon-Si, Gyeonggi-Do (KR)

(72) Inventors: Moon Gyu Han, Yongin-si (KR); Jung Woo Kim, Hwaseong-si (KR); InKyeong Yoo, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 75 days.

(21) Appl. No.: 13/892,560

(22) Filed: May 13, 2013

(65) Prior Publication Data

US 2014/0133010 A1    May 15, 2014

(30) Foreign Application Priority Data

Nov. 14, 2012  (KR) .................. 10-2012-0129098

(51) Int. Cl.
| | | |
|---|---|---|
| *G02F 1/00* | (2006.01) | |
| *G02B 26/00* | (2006.01) | |
| *G02B 6/42* | (2006.01) | |
| *G02F 1/01* | (2006.01) | |
| *G02F 1/03* | (2006.01) | |
| *G02F 1/167* | (2006.01) | |
| *G02B 6/12* | (2006.01) | |
| *G02B 6/293* | (2006.01) | |
| *G06F 3/0354* | (2013.01) | |

(52) U.S. Cl.
CPC ............... *G02F 1/0131* (2013.01); *G02F 1/03* (2013.01); *G02F 1/167* (2013.01); *G02B 6/12007* (2013.01); *G02B 6/29395* (2013.01); *G02F 1/0128* (2013.01); *G06F 3/03545* (2013.01); *G02F 2202/32* (2013.01); *G02F 2203/055* (2013.01)
USPC ............................. 359/322; 359/296; 385/27

(58) Field of Classification Search
CPC ...................... G02B 6/12007; G02B 6/29395
USPC ................. 359/296, 322; 385/27, 39; 345/32
See application file for complete search history.

(56) References Cited

U.S. PATENT DOCUMENTS

| | | |
|---|---|---|
| 2004/0008934 A1* | 1/2004 | Takiguchi et al. .............. 385/27 |
| 2006/0151610 A1 | 7/2006 | Chiang et al. |
| 2011/0148757 A1 | 6/2011 | Lathrop et al. |
| 2011/0198134 A1 | 8/2011 | Chen et al. |
| 2012/0113066 A1 | 5/2012 | Chuang |

FOREIGN PATENT DOCUMENTS

| | | |
|---|---|---|
| JP | 2000-122809 A | 4/2000 |
| JP | 2007-133118 A | 5/2007 |

* cited by examiner

*Primary Examiner* — William Choi
(74) *Attorney, Agent, or Firm* — Harness, Dickey & Pierce, P.L.C.

(57) ABSTRACT

A light-emitting apparatus includes a light source to emit light, a photonic crystal to pass light of different wavelengths based on the light from the light source, and a projector to project the light passing through the photonic crystal. The photonic crystal may be electrically or mechanically controlled to pass the different wavelengths of light.

27 Claims, 8 Drawing Sheets

LIGHT-EMITTING APPARATUS CAPABLE OF ADJUSTING A COLOR OF A PROJECTED LIGHT THEREOF

CROSS-REFERENCE TO RELATED APPLICATIONS

This application claims the benefit of Korean Patent Application No. 10-2012-0129098, filed on Nov. 14, 2012, in the Korean Intellectual Property Office, the disclosure of which is incorporated herein in its entirety by reference.

BACKGROUND

1. Field

The present disclosure relates to light-emitting apparatuses for adjusting a color of projected light.

2. Description of the Related Art

Recently, an input apparatus using an electric pen has been developed and used in various fields. When a user draws a character, a number, or an image with the electric pen, a sensor or a receiver which may recognize the electric pen may input data desired by the user to an apparatus such as a computer or a mobile device. Such a device may therefore replace or supplement the use of a keyboard or mouse.

Other types of pens have also been developed as input devices. Examples include an optical pen which uses a laser or a light emitting diode (LED), and a digital pen which detects distance based on an ultra sound signal or an infrared light.

Input pens, therefore, allow a user to input data just as though the user were using an actual pen. However, there are drawbacks to existing pens. For example, in order to change the color of an image or the thickness of a line using existing pens, a menu needs to be used. More specifically, a user has to use the pen to access and then make selections within different menus of an application program in order to set the color of an image and or the thickness of a line. And, if the color or line thickness has to be changed, the menu needs to be accessed again.

SUMMARY

In accordance with example embodiments, a light-emitting apparatus is provided to allow a user to freely select and project light of a desired color. In accordance with one example embodiment, a light-emitting apparatus comprising: a light source configured to emit light; a photonic crystal configured to pass light of different wavelengths based on the light emitted from the light source; and a projector configured to project the light which passes through the photonic crystal, the photonic crystal configured to be electrically controlled to pass the different wavelengths of light.

The light-emitting apparatus may further include an aperture configured to control a beam diameter of the projected light; a controller configured to control operation of at least one of the photonic crystal or the aperture; and a input device configured to receive a command to be sent to the controller.

The photonic crystal and the aperture may be arranged along an optical axis between the light source and the projector.

The apparatus may further comprise a first transparent electrode coupled to a light incident surface of the photonic crystal; and a second transparent electrode coupled to a light emission surface of the photonic crystal, wherein a first voltage difference between the first and second transparent electrodes corresponds to a first wavelength of the different wavelengths of light, and a second voltage difference between the first and second transparent electrodes corresponds to a second wavelength of the different wavelengths of light.

The photonic crystal may include a colloid solvent and a plurality of photonic crystal particles arranged within the colloid solvent in a periodic structure, and the photonic crystal particles have a surface which is electrically charged such that a repulsive force is applied therebetween. The photonic crystal particles may comprise particles of silica, polymethylmethacrylate (PMMA), poly-n-butylmethacrylate (PBMA), or copolymer thereof.

The photonic crystal may comprise a transparent polymer which contracts or expands based on the first and second voltage differences respectively; and a plurality of photonic crystal particles arranged within the transparent polymer in a periodic structure.

In accordance with another embodiment, a light-emitting apparatus comprises a light source configured to emit light; a photonic crystal configured to pass light of different wavelengths based on the light emitted from the light source; a projector configured to project the light which passes through the photonic crystal; and a deflector configured to apply a pressure to cause the photonic crystal to change between contracted and expanded states, the photonic crystal having a photonic bandgap which varies according to the contracted and expanded states of the photonic crystal, the photonic crystal configured to output a first wavelength of the different wavelengths in the contracted state and configured to output a second wavelength of the different wavelengths in the expanded state.

The apparatus may further comprise an aperture configured to adjust a beam diameter of the projected light; a controller configured to control operation of the aperture; and an input device configured to receive a command to be sent to the controller. The aperture and the photonic crystal may be sequentially arranged along an optical axis between the light source and the projector.

The deflector may comprise a first surface configured to press the photonic crystal; a second surface configured to prevent movement of the photonic crystal in a direction of an optical axis; and a third surface configured to prevent movement of the photonic crystal in a direction crossing the optical axis.

The apparatus may further include a case, wherein the first surface has a portion which protrudes outwardly from the case to contact an external object and configured to slide in forward and backward directions with respect to the case, and wherein, when the first surface contacts the external object, the first surface presses against the photonic crystal to cause the photonic crystal to pass from the expanded state to the contracted state.

The photonic crystal may comprise a transparent elastic material which changes between the contracted state and the expanded state based on a pressure; and a plurality of photonic crystal particles arranged within the transparent elastic material at a periodic structure.

In accordance with another embodiment, a light-emitting apparatus comprises a light source configured to emit light; a photonic crystal configured to reflect light of different wavelengths based on the light emitted from the light source; a projector configured to project the light reflected by the photonic crystal; and a light guide disposed between the photonic crystal and the projector to transmit light emitted from the light source to the photonic crystal and to transmit the light reflected by the photonic crystal to the projector, the photonic crystal having a variable photonic bandgap which is electrically controlled to adjust the wavelength of the reflected light.

The apparatus may further comprise an aperture configured to adjust a beam diameter of the projected light; a controller configured to control operation of at least one of the photonic crystal or the aperture; and an input device configured to receive a command to be transmitted to the controller.

The photonic crystal, the aperture, the light guide, and the optical system may be sequentially arranged along an optical axis, and the light source may be offset from the optical axis and disposed toward an entrance to the light guide.

The apparatus may further comprise a beam splitter disposed at an entrance to the light guide, wherein the beam splitter is configured to reflect light emitted from the light source toward the photonic crystal and to pass the light reflected by the photonic crystal.

The apparatus may further comprise a first transparent electrode disposed on a light incident surface of the photonic crystal, and a second transparent electrode disposed on a light emission surface of the photonic crystal.

The photonic crystal may include a colloid solvent, and plurality of photonic crystal particles arranged within the colloid solvent in a periodic structure, the photonic crystal particles having a surface which is electrically charged such that a repulsive force is applied therebetween. The photonic crystal particles comprise particles of silica, polymethylmethacrylate (PMMA), poly-n-butylmethacrylate (PBMA), or copolymer thereof.

The photonic crystal may comprise a transparent polymer which expands and contracts based on electrical stimulus; and a plurality of photonic crystal particles arranged within the transparent polymer in a periodic structure.

In accordance with another embodiment, a light-emitting apparatus comprises a light source configured to emit light; a photonic crystal configured to reflect light of different wavelengths based on the light emitted from the light source; a projector configured to project the light reflected by the photonic crystal; and a deflector configured to apply pressure for causing the photonic crystal to change between contracted and expanded states, the photonic crystal having a photonic bandgap which varies in the contracted and expanded states to adjust the wavelength of the reflected light.

The apparatus may further comprise an aperture configured to control a beam diameter of the projected light; a controller configured to control operation of at least one of the photonic crystal or the aperture; and an input device configured to receive a command to be sent to the controller.

The deflector may comprise a first surface configured to press the photonic crystal; a second surface configured to prevent movement of the photonic crystal in a direction of an optical axis; and a third surface configured to prevent movement of the photonic crystal in a direction crossing to the optical axis.

The apparatus may further comprise a case, wherein the first surface has a portion which protrudes outwardly from the case to contact an external object and is configured to slide forward and backward with respect to the case, and wherein, when the first surface slides in the backward direction, the first surface presses against the photonic crystal.

The first surface may have a cylinder shape or a polygonal tube shape, and the light source and aperture are disposed adjacent the first surface.

The photonic crystal may comprise a transparent elastic material which changes between expanded and contracts states based on an pressure; and a plurality of photonic crystal particles arranged within the transparent elastic material at a periodic structure.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

In the drawings, it is understood that the thicknesses of layers and regions may be exaggerated for clarity. It will also be understood that when a layer is referred to as being "on" another layer or substrate, it can be directly on the other layer or substrate or intervening layers may also be present. Like reference numerals in the drawings denote like elements, and thus their description will not be repeated. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved Hereinafter, a light-emitting apparatus capable of adjusting light of projected light will be described in detail with reference to the accompanying drawings. In the drawings, like reference numerals refer to like elements throughout, and for illustrative and clarification purposes, respective elements in the drawings may be exaggerated in size. Also, exemplary embodiments described herein are given for illustrative purposes only and various modifications thereof may be made. Further, in a layered structure described herein, the term "upper portion" or "upper" should be understood as including not only one element contacting and directly being on the other element but also one element being above the other element without contacting the other element.

Figure 1:
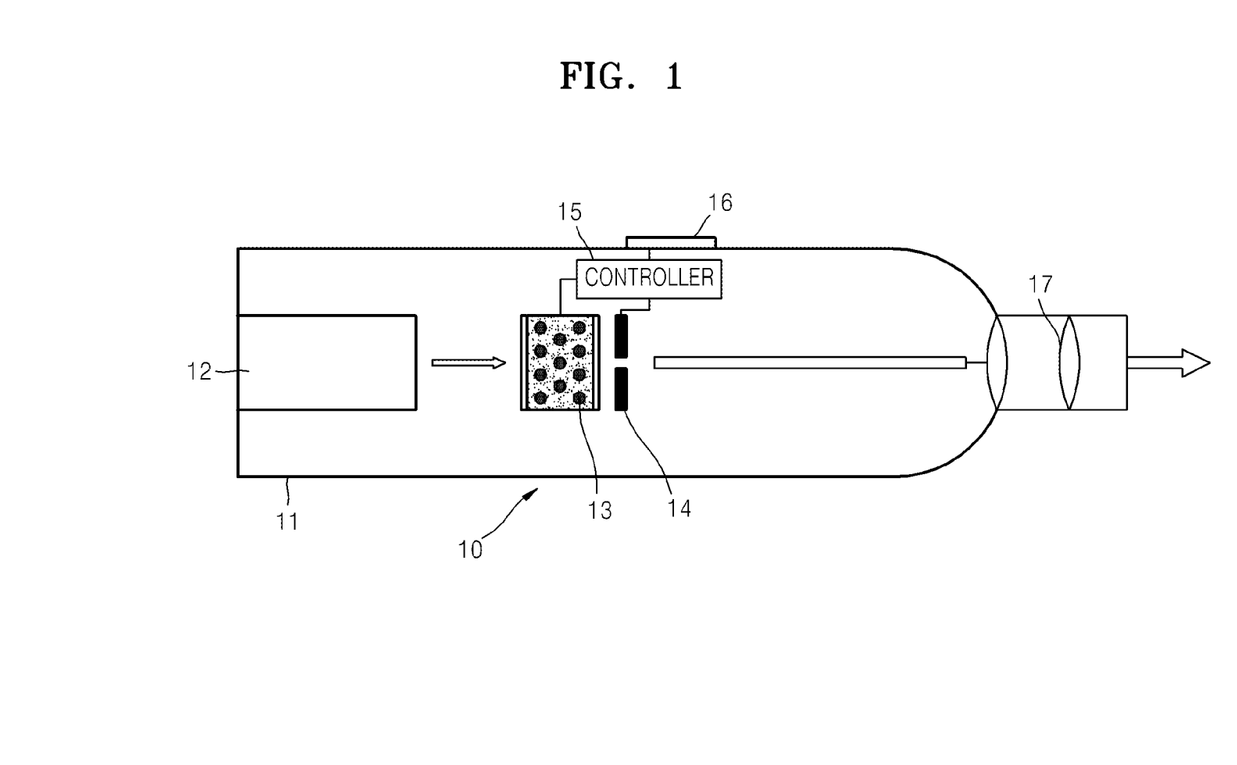
FIG. 1 is a schematic view illustrating an embodiment of a light-emitting apparatus.

FIG. 1 is a schematic view illustrating an example embodiment of a light emitting apparatus 10. In this example, the light-emitting apparatus includes a transmissive photonic crystal which may be electrically controlled.

Referring to FIG. 1, the light-emitting apparatus 10 includes a light source 12 emitting a white light, a filter in the form of an photonic crystal 13 passing only light of a predetermined wavelength of the white light, and an optical system 17 projecting the light which passes through the photonic crystal 13 toward an external surface. The photonic crystal 13 may change a photonic bandgap according to an electrical control signal to adjust a wavelength of projected light.

In addition to these features, the light-emitting apparatus 10 may include an aperture 14 for adjusting a beam diameter of the projected light, and a controller 15 for controlling an operation of the photonic crystal 13 and the aperture 14 according to a user command. The light-emitting apparatus 10 may further include one or more control buttons and/or a control panel 16 for receiving a user command and transmitting the user command to the controller 15. The control button(s) may, for example, be pressed to toggle or otherwise switch between multiple colors to be output.

In addition, the light-emitting apparatus 10 may include a case 11 in which the light source 12, the photonic crystal 13, the aperture 14, and the controller 15 are located within an internal space of the case 11.

One or more control button(s), a control panel 16 or another type of input device and an optical system 17 or projector may be disposed on an external surface of the case 11. For example, the light source 12 and the optical system 17 may be disposed at opposing ends of the case 11, respectively, along a direction of an optical axis. Also, the photonic crystal 13 and the aperture 14 may be disposed along a direction of an optical axis between the light source 12 and the optical system 17 or projector. Although it is shown in FIG. 1 that the aperture 14 is disposed between the photonic crystal 13 and the optical system 17, in alternative embodiments the aperture 14 may be disposed between the light source 12 and the photonic crystal 13. The optical system 17 or projector may include one or more lens, prisms, or other light-adjusting elements for directing or otherwise adjusting the output light.

The light source 12 may emit white light including all spectrums of the visible light region and, for example, a light-emitting diode (LED) or a laser diode (LD) may be used as the light source 12. The white light emitted from the light source 12 may pass through the photonic crystal 13, may be adjusted in terms of its beam diameter by the aperture 14, and may be projected outside the pen through the optical system 17.

The photonic bandgap of the photonic crystal 13 may be electrically and continuously controlled according to an electrical signal provided by the controller 15. According to the photonic bandgap of the photonic crystal 13, a wavelength (i.e., color) of the projected light may be determined. For example, of the white light which is incident on the photonic crystal 13, only a portion of light having a color such as red, green or blue may pass through the photonic crystal 13 according to control of the controller 15. Therefore, a user may freely select a color and a beam diameter of the projected light through the control panel 16.

In accordance with an example embodiment, the photonic crystal 13 may correspond to an artificial crystal formed, for example, by regularly arranging two or more different materials having different refractive indexes in a two-dimensional or a three-dimensional manner. When the photonic crystal 13 has a regular lattice structure, the photonic crystal 13 may have a photonic bandgap that sufficiently blocks or passes light having a desired wavelength due to periodic distribution of a refractive index.

The photonic bandgap of the photonic crystal 13 may vary according to a refractive index and a periodic structure of materials constituting the photonic crystal 13. Therefore, by electrically modifying the periodic structure of the photonic crystal 13, it is possible to adjust the photonic bandgap of the photonic crystal 13.

Figure 2A:
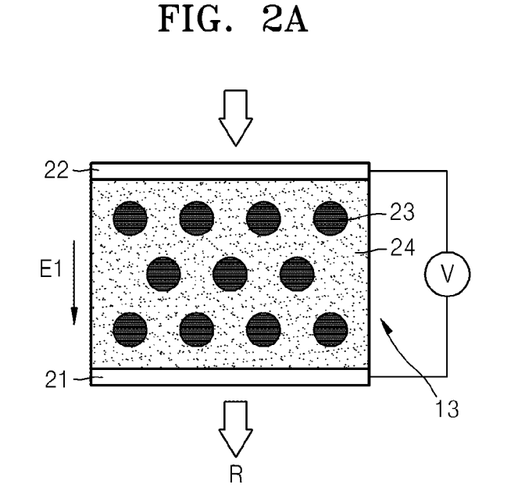
FIGS. 2A and 2B illustrate examples of the structure and operation of a transmissive photonic crystal shown in FIG. 1 according to one embodiment.
Figure 2B:
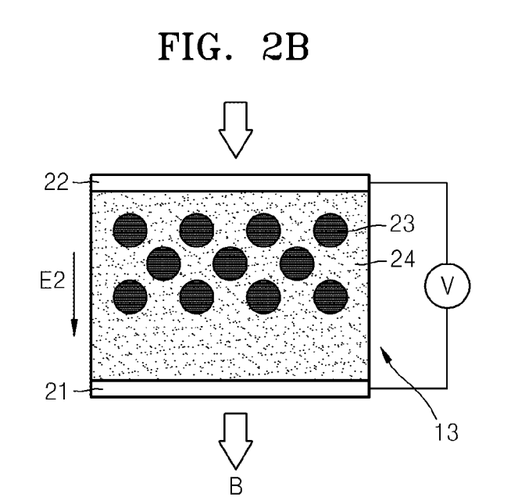

FIGS. 2A and 2B illustrate an exemplary structure and operation of the transmissive photonic crystal 13 shown in FIG. 1 according to an example embodiment. Referring to FIGS. 2A and 2B, the photonic crystal 13 may include a colloid solvent 24 and photonic crystal particles 23 distributed within the colloid solvent 24. For example, the colloid solvent 24 may include an inorganic solvent such as water.

Additionally, or alternatively, the photonic crystal particle 23 may be a nano-size particle having an electrically charged surface. The photonic crystal particle 23 may be manufactured, for example, by applying an electric stimulus to a metal particle, or alternatively the photonic crystal particle 23 may be manufactured by using a polarized material which polarizes itself on a surface thereof. According to one embodiment, a zeta potential of about −70 mV may be naturally generated on a surface of a polystyrene nano-size particle having a diameter of about 135 nm.

The photonic crystal particles 23 having a surface which is electrically charged are arranged by themselves due to a repulsive force between them within the colloid solvent 24. As a result, the charged photonic crystal particles 23 within the colloid solvent 24, may be arranged in a periodic structure at a regular interval. Due to such a periodic structure, the colloid solvent 24 and the photonic crystal particles 23 distributed within the colloid solvent 24 may have a characteristic of the photonic crystal.

The photonic bandgap of the photonic crystal 13, including the colloid solvent 24 and the photonic crystal particles 23, may be determined according to a refractive index of the colloid solvent 24, a refractive index of the photonic crystal particle 23, and/or a size and a density of the photonic crystal particle 23.

For example, when water is used as the colloid solvent 24 and polystyrene particles having a diameter of about 100 nm to 500 nm are used as the photonic crystal particles 23, the photonic crystal 13 may be formed which passes a certain type (e.g., wavelength or color) of light and reflects other types (colors or wavelengths) of light in the visible light region. In one example arrangement, a volume ratio of each photonic crystal particle 23 may lie in a range of about 5 vol. % to 50 vol. %. In alternative embodiments, instead of polystyrene particles, silica, polymethylmethacrylate (PMMA), poly-n-butylmethacrylate (PBMA), and/or copolymer particles may be used as the photonic crystal particles 23.

Also, because the photonic crystal particles 23 are electrically charged, it is possible to adjust the photonic bandgap of the photonic crystal by modifying an interval between the photonic crystal particles 23. This may be accomplished by applying an electrical field to the photonic crystal 13.

For example, as shown in FIGS. 2A and 2B, transparent electrodes 21 and 22 may be disposed on a light incident surface and a light emission surface of the photonic crystal 13 respectively, and a voltage applied to the transparent electrodes 21 and 22 may be adjusted. When the voltage between the transparent electrodes 21 and 22 is increased, photonic crystal particles 23 which are charged with a negative charge are drawn more toward a positive electrode. Alternatively, photonic crystal particles 23 which are charged with a positive charge are drawn more toward a negative electrode when the voltage is applied. As a result, a periodic interval between the photonic crystal particles 23 may be reduced, to thereby filter the color or wavelength of light from the photonic crystal.

More specifically, as shown in FIG. 2A, the voltage difference between the transparent electrodes 21 and 22 may be adjusted to apply an electric field E1 to the photonic crystal 13. Based on this voltage difference (which, for example, may be generated by applying a voltage of a certain level to one or both of transparent electrodes 21 and 22), the photonic crystal particles 23 are rearranged within the colloid solvent 24 such that, for example, only light of a red wavelength may pass the photonic crystal 13.

As shown in FIG. 2B, the voltage difference between the transparent electrodes 21 and 22 may be adjusted to apply an electrical field E2 to the photonic crystal 13. Based on this voltage difference, the interval between the photonic crystal particles 23 within the colloid solvent 24 may be changed due to the electric field of E2 such that, for example, only light of a blue wavelength may pass the photonic crystal 13.

Figure 3A:
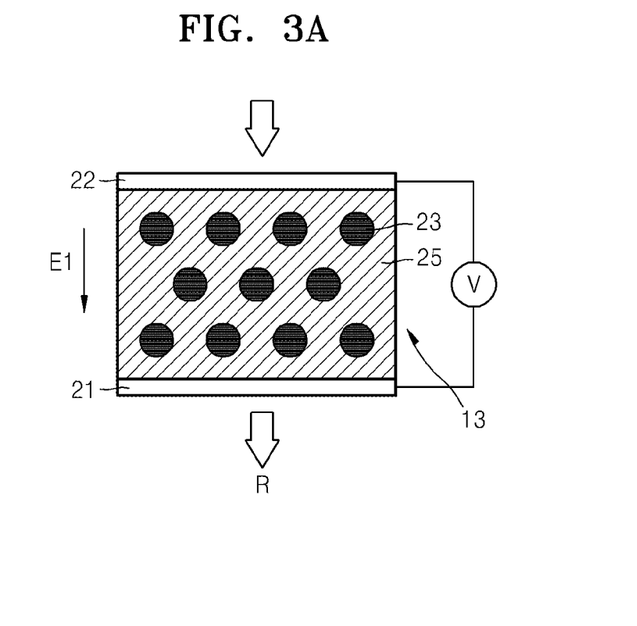
FIGS. 3A and 3B illustrate examples of the structure and operation of a transmissive photonic crystal shown in FIG. 1 according to another embodiment.
Figure 3B:
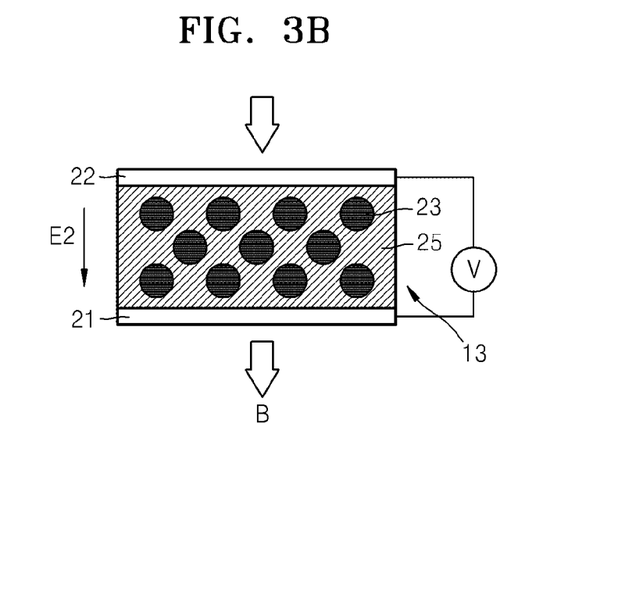

FIGS. 3A and 3B illustrate an exemplary structure and operation of the transmissive photonic crystal 13 shown in FIG. 1 according to another embodiment. Referring to FIGS. 3A and 3B, the photonic crystal 13 may include a transparent polymer 25 which is elastic and a plurality of photonic crystal particles 23 distributed within the transparent polymer 25. The photonic crystal particle 23 may be disposed and fixed within the transparent polymer 25 at a certain interval or period. Unlike the previous embodiment, in this embodiment the photonic crystal parties move based on the changing elasticity of polymer 25.

More specifically, transparent polymer 25 may be composed of a material that expands and contracts based on an electrical stimulus. For example, the polymer material may include cross-linked poly (ferrocenylsilane) and substituents thereof, dielectric elastomer such as acrylic elastomer, silicon elastomer, or fluorine rubber, electrostrictive polymer such as polyvinylidene fluoride (PVDF), or block copolymer such as polystyrene-polvinylpyridine (PS-PVP).

In the case of the photonic crystal 13 shown in FIGS. 3A and 3B, when the transparent polymer 25 contracts or expands by electrical stimulus, the interval between the photonic crystal particles 23 (which are distributed and buried in the transparent polymer 25) changes. As a result, it is possible to adjust the photonic bandgap of the photonic crystal 13.

For example, as shown in FIGS. 3A and 3B, transparent electrodes 21 and 22 may be disposed on the light incident surface and the light emission surface of the photonic crystal 13 respectively. When a voltage difference is applied between transparent electrodes 21 and 22 (e.g., by applying voltages to one or more of electrodes 21 and 22), the photonic bandgap of crystal 13 may be adjusted.

As shown in FIG. 3A, when a voltage difference between transparent electrodes 21 and 22 is adjusted such that the electrical field E1 is applied to the photonic crystal 13, the transparent polymer 25 expands and only light of a red wavelength may pass through the photonic crystal 13. As shown in FIG. 3B, when a voltage difference between the transparent electrodes 21 and 22 is adjusted such that the electrical field E2 is applied to the photonic crystal 13, the transparent polymer 25 contracts and only light of a blue wavelength may pass through the photonic crystal 13.

Figure 4:
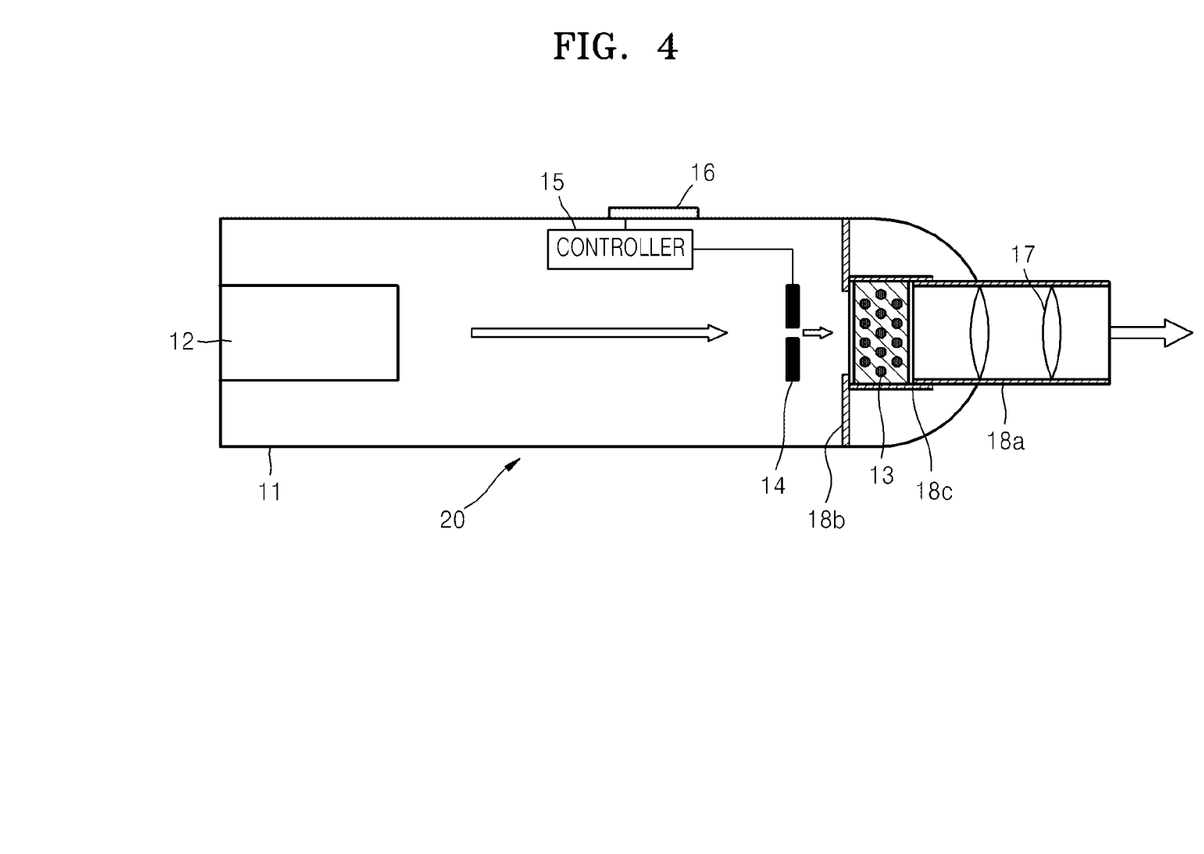
FIG. 4 is a schematic view illustrating the structure of a light-emitting apparatus according to another embodiment.

FIG. 4 is a conceptual view illustrating a schematic structure of a light-emitting apparatus 20 according to another embodiment. In this embodiment, an example of a light-emitting apparatus is discussed which includes a transmissive photonic crystal that is mechanically controlled.

Referring to FIG. 4, the light-emitting apparatus 20 includes the light source 12 emitting white light, the photonic crystal 13 passing only light having a predetermined wavelength of the white light, the optical system 17 projecting the light which passes through the photonic crystal 13 toward the outside, the aperture 14 for adjusting the beam diameter of the projected light, the controller 15 controlling the operation of the aperture 14, the control panel 16 for receiving a user command to be transmitted to the controller 15, and pressing members 18a, 18b, and 18c for elastically contracting or expanding the photonic crystal 13.

Also, the light-emitting apparatus 20 may include the case 11 in which the light source 12, the photonic crystal 13, the aperture 14, and the controller 15 may be fixed within an internal space of the case 11. Also, the control button(s), panel 16, or another type of input device and the optical system 17 may be disposed output or on an external surface of the case 11. For example, the light source 12 and the optical system 17 may be disposed on opposing ends of the case 11, respectively, along the direction of the optical axis, and the aperture 14 and the photonic crystal 13 may be disposed in left-to-right order along the direction of the optical axis between the light source 12 and the optical system 17.

Also, the pressing members 18a, 18b, and 18c may be disposed within and/or on the case 11 to support the optical system 17 and the photonic crystal 13. According to one possible arrangement, the pressing members 18a, 18b, and 18c may include a first pressing member 18a which is disposed to partially contact the light emission surface of the photonic crystal 13 to press the photonic crystal 13 and a second and a third pressing members 18b and 18c for fixing and supporting the photonic crystal 13 such that the photonic crystal 13 may not be deviated from the optical axis.

The first pressing member 18a may be formed in a cylinder shape or a polygonal tube shape in which the optical system 17 may be disposed inside. Also, the first pressing member 18a may have a portion which protrudes outwardly from the case 11 and may be configured to be slidable forward and backward with respect to the case 11.

The second pressing member 18b is fixed within the case 11 and performs a role of supporting the photonic crystal 13 to not move in the optical axis direction. Also, the second pressing member 18b may be formed as a transparent material or a flat panel having an opening formed in a central portion thereof such that light may pass therethrough, or may be a plurality of supports fixed between an internal wall of the case 11 and the photonic crystal 13.

The third pressing member 18c performs a role of supporting the photonic crystal 13 to not move in a direction perpendicular to the optical axis and may be configured to surround at least a part of a lateral side of the photonic crystal 13. In one embodiment, the second pressing member 18b and the third pressing member 18c may be integrally formed. In other embodiments, members 18b and 18c are separately provided.

Figure 5A:
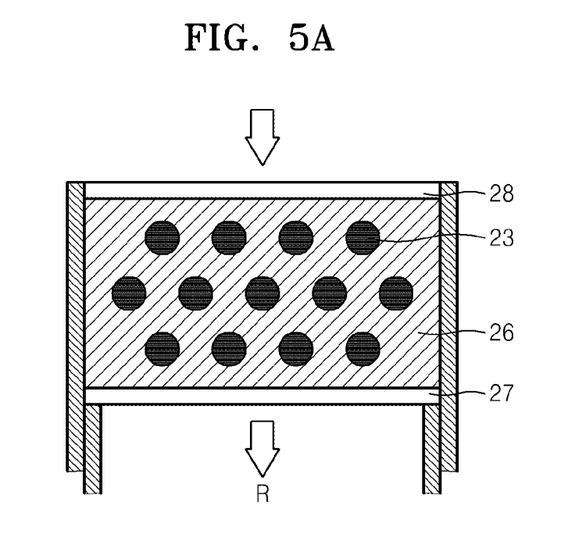
FIGS. 5A and 5B illustrate an example of the structure and operation of a transmissive photonic crystal shown in FIG. 4.
Figure 5B:
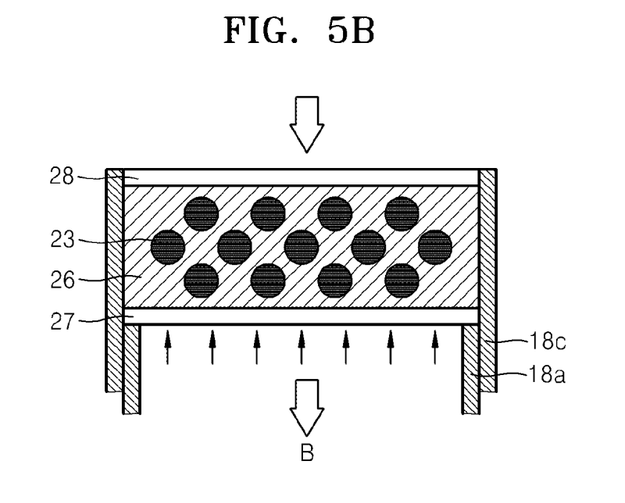

FIGS. 5A and 5B illustrate an example of the structure and operation of the transmissive photonic crystal 13 shown in FIG. 4. Referring to FIGS. 5A and 5B, the photonic crystal 13 may include a transparent elastic material 26 and a plurality of photonic crystal particles 23 distributed within the transparent elastic material 26. The photonic crystal particles 23 may be disposed and fixed at a periodic interval within the transparent elastic material 26.

One type of the transparent elastic material 26 includes a transparent polymer material which contracts by external pressure and is elastically recovered when an external force is removed. Other examples of the transparent elastic material 26 include poly dimethylsiloxane (PDMS), block copolymer of poly styrene (PS)-poly vinyl pyrrolidone (PVP), cross-linked acryl polymer such as ethoxylated trimethyloppropane triacrylate.

Transparent substrates 27 and 28 may be respectively disposed on the light incident surface and the light emission surface of the photonic crystal 13 such that the light incident surface and the light emission surface of the photonic crystal 13 may not be modified.

Under this structure, when the user does not contact and press the first pressing member 18a (which protrudes from the case 11 of the light-emitting apparatus 20) against an external object such as, for example, a light-sensing board, the photonic crystal 13 does not contract as shown in FIG. 5A. In this case, only the light of a red wavelength of the light emitted from the light source 12 may pass through the photonic crystal 13.

When the user presses the first pressing member 18a against an external object, the first pressing member 18a deflects to press against at least a portion of the light emission surface of the photonic crystal 13. As a result, the photonic crystal 13 contracts as shown in FIG. 5B. This contraction changes the interval between the photonic crystal particles 23 within the photonic crystal 13, to thereby change the photonic bandgap of the photonic crystal 13. When this occurs, the photonic crystal 13, for example, passes only light in the blue wavelength band.

Therefore, in the light-emitting apparatus 20, the user may adjust the color of the light projected from the light-emitting apparatus 20 by adjusting or applying a force against the first pressing member 18a when pressed against a light-sensing board or other surface. Also, the beam diameter of the projected light may be adjusted by the control panel 16. The one or more pressing members described herein may be referred to as deflectors.

In previously described embodiments, examples of the light-emitting apparatuses 10 and 20 for adjusting the color of light passing through the photonic crystal 13 have been described. In these embodiments, the photonic crystal 13 may transmit, block, or reflect light of a predetermined wavelength according to the photonic bandgap thereof, and thus it is possible to implement a light-emitting apparatus that adjusts the color of the light reflected from the photonic crystal 13.

Figure 6:
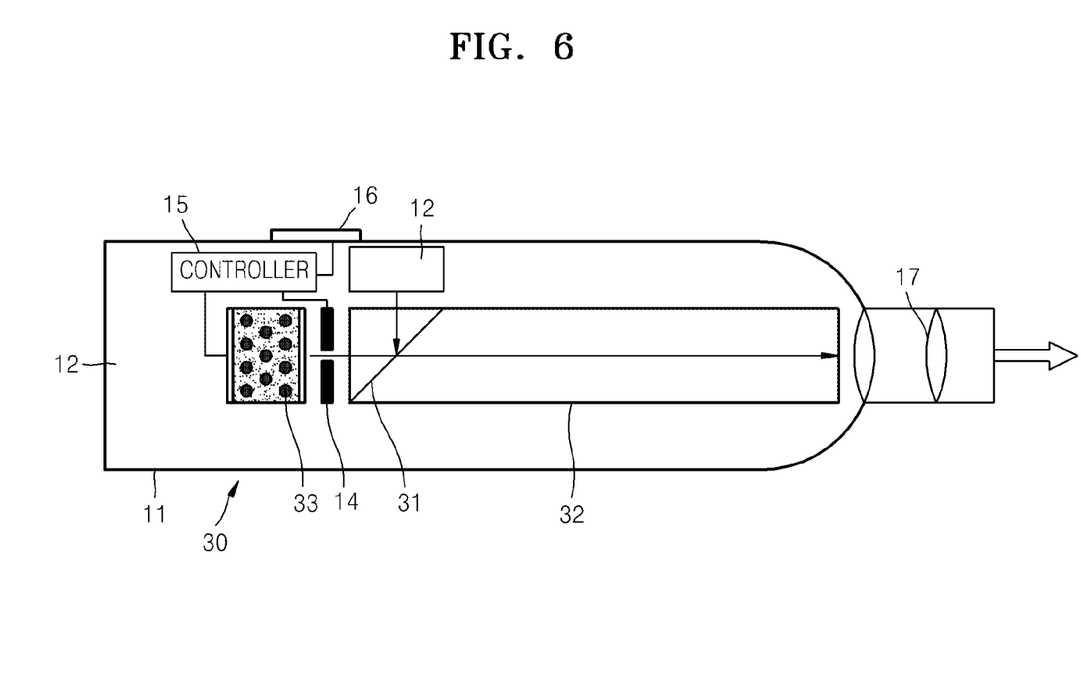
FIG. 6 is a schematic view illustrating a structure of a light-emitting apparatus according to another embodiment.

FIG. 6 is a conceptual view illustrating a schematic structure of a light-emitting apparatus 30 according to another embodiment which includes a reflective photonic crystal which is electrically controlled.

Referring to FIG. 6, the light-emitting apparatus 30 includes the light source 12 emitting white light, a photonic crystal 33 reflecting only light having a certain wavelength of the white light, the optical system 17 projecting the light which passes through the photonic crystal 33 toward an outside surface, and a light guide 32 disposed between the photonic crystal 33 and the optical system 17 to transmit light emitted from the light source 12 to the photonic crystal 33 and transmit light reflected from the photonic crystal 33 to the optical system 17. The photonic crystal 33 may adjust a wavelength of the reflected light by changing the photonic bandgap thereof according to an electrical control.

Also, the light-emitting apparatus 30 includes the aperture 14 for adjusting the beam diameter of the projected light, the controller 15 controlling the operation of the photonic crystal 13 and the aperture 14, and the control panel 16 for receiving a user command and transmitting the user command to the controller 15. For example, the aperture 14 may be disposed between the photonic crystal 33 and the light guide 32.

The light-emitting apparatus 30 may further include the case 11, wherein the light source 12, the photonic crystal 33, the aperture 14, the controller 15, and the light guide 32 may be fixed within the internal space of the case 11, and the control panel 16 and the optical system 17 may be disposed on the external surface of the case 11. For example, the photonic crystal 33, the aperture 14, the light guide 32, and the optical system 17 may be, as shown in FIG. 6, sequentially disposed along the optical axis direction.

The light source 12 may deviate from the light axis and may be disposed toward an entrance to the light guide 32. At the entrance to the light guide 32, for example, a beam splitter 31 may be disposed. Therefore, the light emitted from the light source 12 may be reflected by the beam splitter 31 and be incident on the photonic crystal 33.

The photonic crystal 33 may reflect only light having a predetermined wavelength selected by the user as the photonic bandgap is changed according to an electric control. For example, the structure of the photonic crystal 13 described in FIG. 2A and FIG. 3B may be applied to this exemplary embodiment, but only the photonic bandgap may be changed to reflect only the light in the visible light region. The light reflected from the photonic crystal 33 passes through the aperture 14, passes through the beam splitter 31, and then proceeds within the light guide 32.

Next, the light may arrive at the optical system 17 through an exit of the light guide 32 and may be projected toward the outside by the optical system 17. The beam splitter 31 may be, for example, a transflective mirror or a polarized beam splitter which reflects light in a polarized direction and passes light in other polarized directions.

Figure 7:
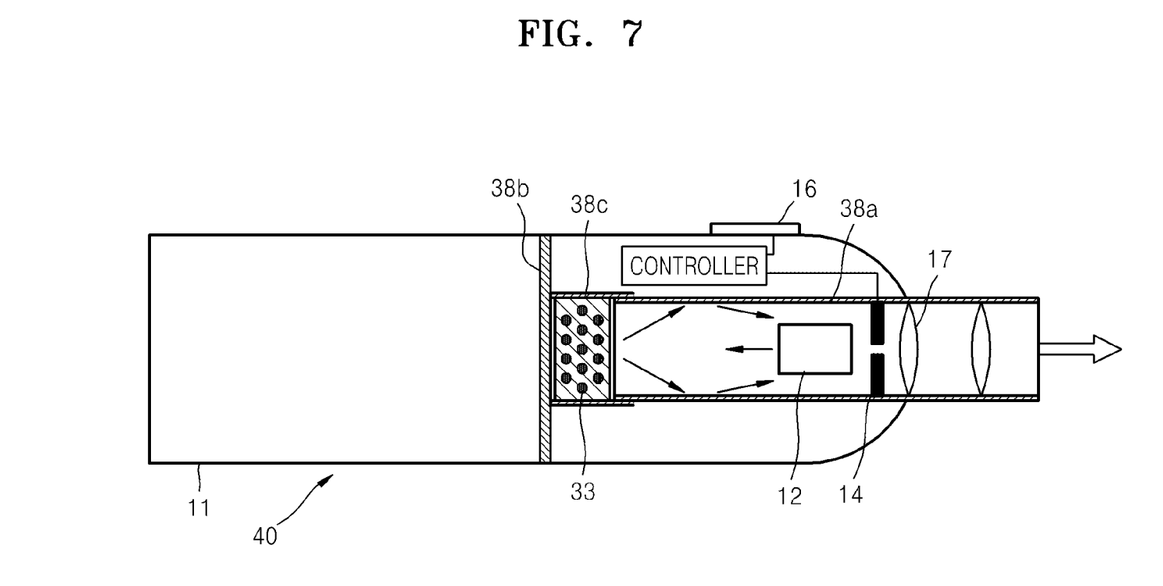
FIG. 7 is a schematic view illustrating a structure of a light-emitting apparatus according to another embodiment.

FIG. 7 is a schematic view illustrating a structure of a light-emitting apparatus 40 according to another embodiment which includes a reflective photonic crystal that is mechanically controlled.

Referring to FIG. 7, the light-emitting apparatus 40 includes the light source 12 emitting white light, the photonic crystal 33 reflecting only light having a certain wavelength of the white light, the optical system 17 projecting the light reflected by the photonic crystal 33 toward the outside, the aperture 14 for controlling a beam diameter of the projected light, the controller 15 controlling the operation of the aperture 14, and the control button(s) or panel 16 transmitting a user command to the controller 15. The apparatus 40 also includes pressing members 38a, 38b, and 38c for elastically contracting or expanding the photonic crystal 33.

The light-emitting apparatus 40 may further include the case 11 in which the light source 12, the photonic crystal 33, the aperture 14, and the controller 15 are fixed within an internal space of the case 11. The control button(s) or panel 16 and the optical system 17 may be disposed outside the cause and/or on the external surface of the case 11.

Also, the pressing members 38a, 38b, and 38c may be disposed within and on the case 11 to support the optical system 17 and the photonic crystal 33. For example, the pressing members 38a, 38b, and 38c may include a first pressing member 38a which is disposed to partially contact a light-reflecting surface of the photonic crystal 33 to press the photonic crystal 33 and a second and a third pressing members 38b and 38c for fixing and supporting the photonic crystal 33 so as not to be deviated from the optical axis.

The first pressing member 38a may be formed in a cylinder shape or a polygonal tube shape in which the optical system 17 may be disposed inside. Also, the first pressing member 38a may have a portion which protrudes outwardly from the case 11 and configured to be slidable forward and backward with respect to the case 11.

The second pressing member 38b is fixed within the case 11 and performs a role of supporting the photonic crystal 33 to not move in the optical axis direction.

The third pressing member 38c performs a role of supporting the photonic crystal 33 to not move in a direction perpendicular to the optical axis and may be configured to surround at least a portion of a lateral side of the photonic crystal 33. Here, the second pressing member 38b and the third pressing member 38c may be integrally formed. In other embodiments, pressing members 38b and 38c may be separated provided.

In addition, within the first pressing member 38a, the light source 12 and the aperture 14 may be disposed. Although not shown in FIG. 7, the light source 12 and the aperture 14 may be, for example, fixed on the optical axis through a plurality of supporters connected to an internal wall of the first pressing member 38a. The light source 12 may be disposed within the first pressing member 38a to emit light toward the photonic crystal 33.

FIG. 7 shows that the aperture 14 is disposed between the light source 12 and the optical system 17. However, the aperture 14 may be disposed anywhere between the photonic crystal 33 and the optical system 17 in other embodiments. In order not to block the light reflected from the photonic crystal 33, the light source 12 and the aperture 14 may be disposed on a non-focal plane of the optical system 17.

In this configuration, only light in a certain wavelength band of the light emitted from the light source 12 is reflected by the photonic crystal 33. The wavelength band of the reflected light may be selected by adjusting a force by which the user presses the first pressing member 38a against an external object such as a light-sensing board, as described in FIGS. 5A and 5B. The light reflected from the photonic crystal 33 may reach the optical system 17 through the first pressing member 38a and may be projected toward the outside by the optical system 17. Here, the internal wall of the first pressing member 38a may have reflectivity in order to prevent light loss.

As described above, the light-emitting apparatuses 10, 20, 30, and 40 may allow the user to freely select the color of the projected light by using the photonic crystals 13 and 33 having a variable photonic bandgap. According to one embodiment, the user may continuously vary the color of the projected light within the visible light region according to a range of the photonic bandgap of the photonic crystals 13 and 33. Also, it is possible that the user may freely adjust the beam diameter of the projected light.

Therefore, the light-emitting apparatuses 10, 20, 30, and 40 may be used, for example, as an optical pen capable of allowing the user to select a desired image color and a desired line thickness from the pen itself. Also, the light-emitting apparatuses 10, 20, 30, and 40 may be used to provide a light of various colors not only as the optical pen but also as an optical pointer, an educational terminal, an electrical board, etc.

In the aforementioned embodiments, the photonic bandgap of a photonic crystal is discussed as outputting blue or red light. In other embodiments, the phontonic bandgap may be adjusted to output additional colors of light. Also, the aforementioned embodiments are discussed as switching between two colors of output light. In other embodiments, more than two colors of light may controlled for output.

Figure 8:
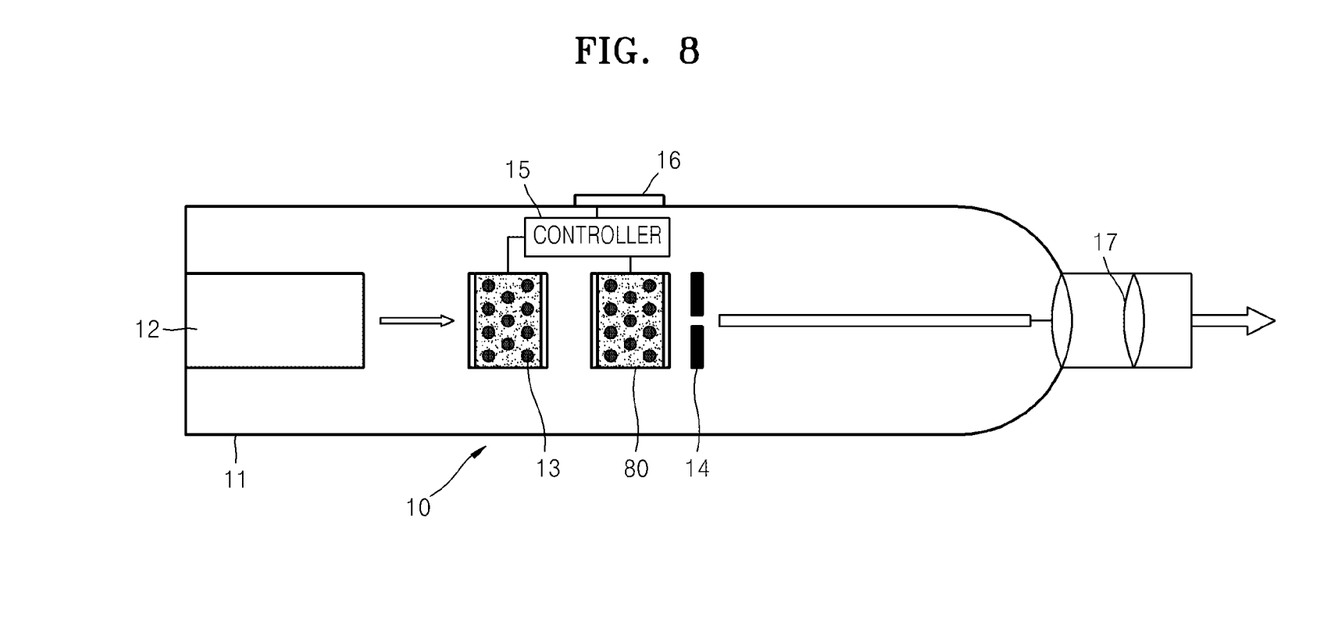
FIG. 8 is a schematic view illustrating a structure of a light-emitting apparatus according to another embodiment.

FIG. 8 is a schematic view illustrating a structure of a light-emitting apparatus according to another embodiment. In this embodiment, the apparatus outputs more than two colors of light using photonic crystal 13 and a filter 80. The photonic crystal 13 is tuned to output two colors of light (e.g., blue and red) when different control signals or mechanical pressures are applied, and the filter may be tuned to one or more different wavelengths.

For example, the filter may be tuned, designed, or otherwise designed to pass a combination of the light output from the photonic crystal 13 and another wavelength of light. When the other wavelength of light is yellow and the photonic crystal outputs red light, the combined output light is orange. When the photonic crystal outputs blue light, the combined output light is green.

In accordance with one embodiment, the filter may be a resonator which is tuned to one color or which changes between two or more colors. An example of such a resonator is a metal-insulator-metal resonator. When such a resonator is used, the resonator may be tuned to yellow when a first voltage is applied and may be clearly transparent when another voltage is applied. In this case, four colors of light may be output: blue when the photonic crystal outputs blue and the resonator is transparent; red when the photonic crystal outputs red and the resonator is transparent; green when the photonic crystal outputs blue and the resonator is set to yellow; and orange when the photonic crystal outputs red and the resonator is set to yellow.

The photonic crystal and resonator may be electronically controlled to output the different colors and/or mechanically controlled. In an electronic control embodiment, a surface of the apparatus may include a control button which, when pressed repeatedly, causes the different colors of light to be output sequentially. In other embodiments, multiple buttons may be included, one for each color.

Instead of a resonator, another photonic crystal tuned to different colors (e.g., ones different from photonic crystal 13) may be used as filter 80.

Also, instead of a photonic crystal, at least one embodiment may use a photonic crystal fiber designed to output different colors of light based on electronic control signals and/or the application of mechanical pressure. Examples of photonic crystal fibers include photonic bandgap fibers, holey fibers which use air holes in their cross-sections to separate, block or pass light of certain wavelengths, hole-assisted fibers which guide light based on higher-index cores modified by the presence of air holes), and so-called Bragg fibers made from concentric rings of multilayer film(s)).

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A light-emitting apparatus comprising:
    a light source configured to emit light;
    a photonic crystal configured to pass light of different wavelengths based on the light emitted from the light source; and
    a projector configured to project the light which passes through the photonic crystal, the photonic crystal configured to be electrically controlled to selectively pass the different wavelengths of light.

2. The light-emitting apparatus of claim 1, further comprising:
    an aperture configured to control a beam diameter of the projected light;
    a controller configured to control operation of at least one of the photonic crystal or the aperture; and
    a input device configured to receive a command to be sent to the controller.

3. The light-emitting apparatus of claim 2, wherein the photonic crystal and the aperture are arranged along an optical axis between the light source and the projector.

4. The light-emitting apparatus of claim 1, further comprising:
    a first transparent electrode coupled to a light incident surface of the photonic crystal; and
    a second transparent electrode coupled to a light emission surface of the photonic crystal, wherein
    a first voltage difference between the first and second transparent electrodes corresponds to a first wavelength of the different wavelengths of light, and
    a second voltage difference between the first and second transparent electrodes corresponds to a second wavelength of the different wavelengths of light.

5. The light-emitting apparatus of claim 4, wherein the photonic crystal includes
    a colloid solvent, and a plurality of photonic crystal particles arranged within the colloid solvent in a periodic structure, and
    the photonic crystal particles have a surface which is electrically charged such that a repulsive force is applied therebetween.

6. The light-emitting apparatus of claim 5, wherein the photonic crystal particles comprise particles of silica, polymethylmethacrylate (PMMA), poly-n-butylmethacrylate (PBMA), or copolymer thereof.

7. The light-emitting apparatus of claim 4, wherein the photonic crystal comprises
    a transparent polymer which contracts or expands based on the first and second voltage differences respectively; and
    a plurality of photonic crystal particles arranged within the transparent polymer in a periodic structure.

8. A light-emitting apparatus comprising:
    a light source configured to emit light;
    a photonic crystal configured to pass light of different wavelengths based on the light emitted from the light source;
    a projector configured to project the light which passes through the photonic crystal; and
    a deflector configured to apply a pressure to cause the photonic crystal to change between contracted and expanded states, the photonic crystal having a photonic bandgap which varies according to the contracted and expanded states of the photonic crystal, the photonic crystal configured to output a first wavelength of the different wavelengths in the contracted state and configured to output a second wavelength of the different wavelengths in the expanded state.

9. The light-emitting apparatus of claim 8, further comprising:
    an aperture configured to adjust a beam diameter of the projected light;
    a controller configured to control operation of the aperture; and
    an input device configured to receive a command to be sent to the controller.

10. The light-emitting apparatus of claim 9, wherein the aperture and the photonic crystal are sequentially arranged along an optical axis between the light source and the projector.

11. The light-emitting apparatus of claim 8, wherein the deflector comprises:
    a first surface configured to press the photonic crystal;
    a second surface configured to prevent movement of the photonic crystal in a direction of an optical axis; and
    a third surface configured to prevent movement of the photonic crystal in a direction crossing the optical axis.

12. The light-emitting apparatus of claim 11, further comprising:
    a case,
    wherein the first surface has a portion which protrudes outwardly from the case to contact an external object and configured to slide in forward and backward directions with respect to the case, and
    wherein, when the first surface contacts the external object, the first surface presses against the photonic crystal to cause the photonic crystal to pass from the expanded state to the contracted state.

13. The light-emitting apparatus of claim 8, wherein the photonic crystal comprises:
    a transparent elastic material which changes between the contracted state and the expanded state based on a pressure; and
    a plurality of photonic crystal particles arranged within the transparent elastic material at a periodic structure.

14. A light-emitting apparatus comprising:
    a light source configured to emit light;
    a photonic crystal configured to reflect light of different wavelengths based on the light emitted from the light source;
    a projector configured to project the light reflected by the photonic crystal; and a light guide disposed between the photonic crystal and the projector to transmit light emitted from the light source to the photonic crystal and to transmit the light reflected by the photonic crystal to the projector, the photonic crystal having a variable photonic bandgap which is electrically controlled to adjust the wavelength of the reflected light.

15. The light-emitting apparatus of claim 14, further comprising:
an aperture configured to adjust a beam diameter of the projected light;
a controller configured to control operation of at least one of the photonic crystal or the aperture; and
an input device configured to receive a command to be transmitted to the controller.

16. The light-emitting apparatus of claim 15, wherein
the photonic crystal, the aperture, the light guide, and the optical system are sequentially arranged along an optical axis, and
the light source is offset from the optical axis and disposed toward an entrance to the light guide.

17. The light-emitting apparatus of claim 16, further comprising:
a beam splitter disposed at an entrance to the light guide, wherein the beam splitter is configured to reflect light emitted from the light source toward the photonic crystal and to pass the light reflected by the photonic crystal.

18. The light-emitting apparatus of claim 14, further comprising:
a first transparent electrode disposed on a light incident surface of the photonic crystal, and
a second transparent electrode disposed on a light emission surface of the photonic crystal.

19. The light-emitting apparatus of claim 18, wherein the photonic crystal includes
a colloid solvent, and
a plurality of photonic crystal particles arranged within the colloid solvent in a periodic structure, the photonic crystal particles having a surface which is electrically charged such that a repulsive force is applied therebetween.

20. The light-emitting apparatus of claim 19, wherein the photonic crystal particles comprise particles of silica, polymethylmethacrylate (PMMA), poly-n-butylmethacrylate (PBMA), or copolymer thereof.

21. The light-emitting apparatus of claim 14, wherein the photonic crystal comprises:
a transparent polymer which expands and contracts based on electrical stimulus; and
a plurality of photonic crystal particles arranged within the transparent polymer in a periodic structure.

22. A light-emitting apparatus comprising:
a light source configured to emit light;
a photonic crystal configured to reflect light of different wavelengths based on the light emitted from the light source;
a projector configured to project the light reflected by the photonic crystal; and
a deflector configured to apply pressure for causing the photonic crystal to change between contracted and expanded states, the photonic crystal having a photonic bandgap which varies between the contracted and expanded states to adjust the wavelength of the reflected light.

23. The light-emitting apparatus of claim 22, further comprising:
an aperture configured to control a beam diameter of the projected light;
a controller configured to control operation of at least one of the photonic crystal or the aperture; and
an input device configured to receive a command to be sent to the controller.

24. The light-emitting apparatus of claim 22, wherein the deflector comprises:
a first surface configured to press the photonic crystal;
a second surface configured to prevent movement of the photonic crystal in a direction of an optical axis; and
a third surface configured to prevent movement of the photonic crystal in a direction crossing to the optical axis.

25. The light-emitting apparatus of claim 24, further comprising:
a case,
wherein the first surface has a portion which protrudes outwardly from the case to contact an external object and is configured to slide forward and backward with respect to the case, and
wherein, when the first surface slides in the backward direction, the first surface presses against the photonic crystal.

26. The light-emitting apparatus of claim 25, wherein
the first surface has a cylinder shape or a polygonal tube shape, and
the light source and aperture are disposed adjacent the first surface.

27. The light-emitting apparatus of claim 22, wherein the photonic crystal comprises:
a transparent elastic material which changes between expanded and contracts states based on a pressure; and
a plurality of photonic crystal particles arranged within the transparent elastic material at a periodic structure.

* * * * *